Nov. 12, 1935. C. S. ASH 2,020,866
VEHICLE WHEEL AND METHOD OF FORMING SAME
Filed Oct. 23, 1930 2 Sheets-Sheet 2

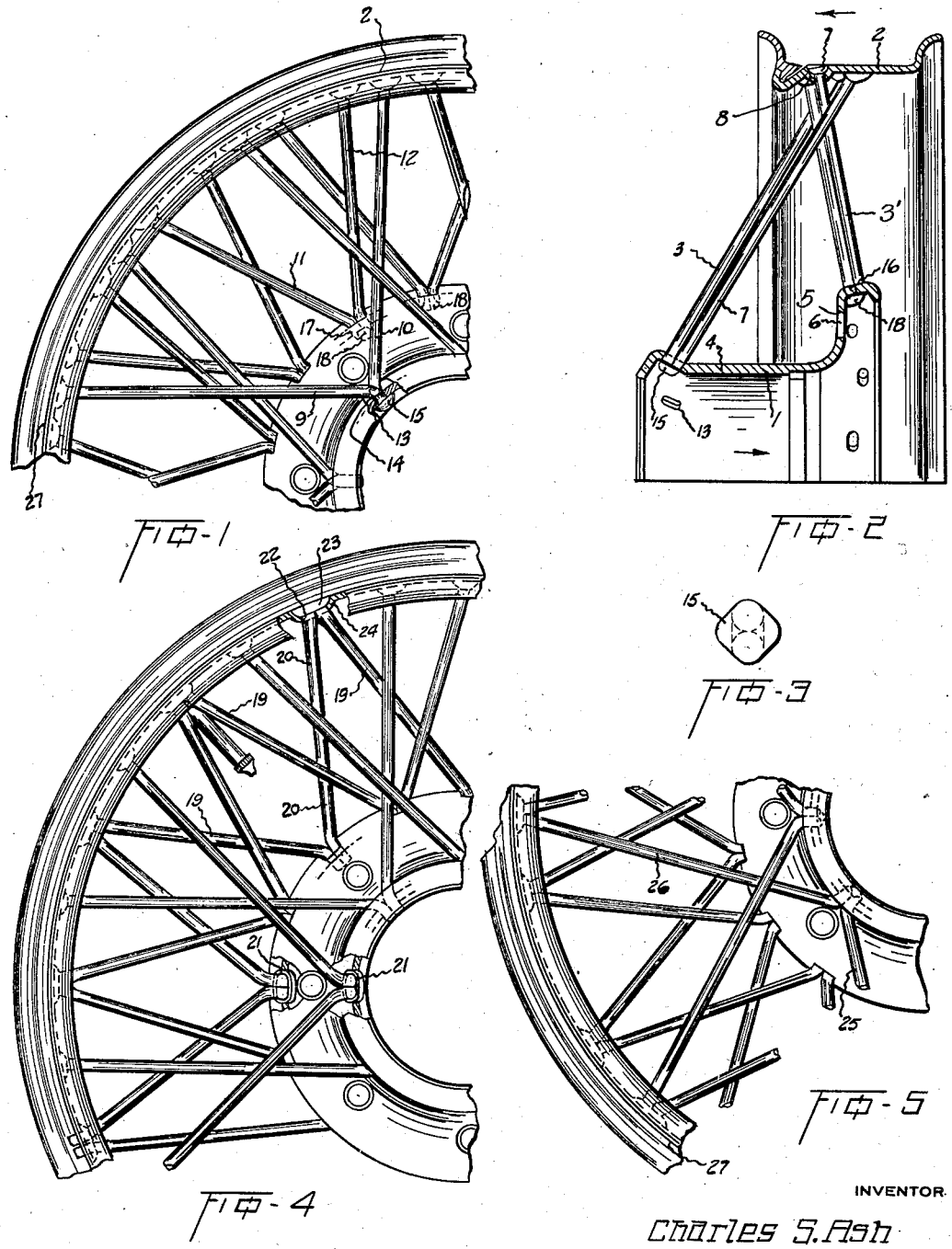

INVENTOR.
Charles S. Ash
BY
ATTORNEY.

Patented Nov. 12, 1935

2,020,866

UNITED STATES PATENT OFFICE 2,020,866

VEHICLE WHEEL AND METHOD OF FORMING SAME

Charles S. Ash, Birmingham, Mich., assignor, by mesne assignments, to The Kelsey-Hayes Wheel Company, Detroit, Mich., a corporation of Delaware Application October 23, 1930, Serial No. 490,747

7 Claims. (Cl. 29—159.02)

The invention relates to vehicle wheels and the method of forming the same and refers more particularly to vehicle wheels of the wire spoked suspension type and the method of forming the same by welding the spokes in place. One of the objects of the invention is to produce a wheel of simple, strong and rigid construction and adapted to be assembled by a welding process by means of which process the wheel is cheap to manufacture. Another object is to provide the wheel with a spoke arrangement whereby the spokes may be welded to the hub or mounting member or to the rim member, if desired, in a manner to obviate welding defects and to facilitate the welding operation.

These and other objects of the invention will be apparent from the following description, taken in connection with the accompanying drawings, in which Figure 1 is a side elevation, partly broken away, of a portion of a wheel showing an embodiment of my invention;

Figure 2 is a section therethrough;

Figure 3 is a plan view of one of the heads at the inner ends of a pair of spokes;

Figures 4 and 5 are views similar to Figure 1, showing other embodiments of my invention;

Figure 6:
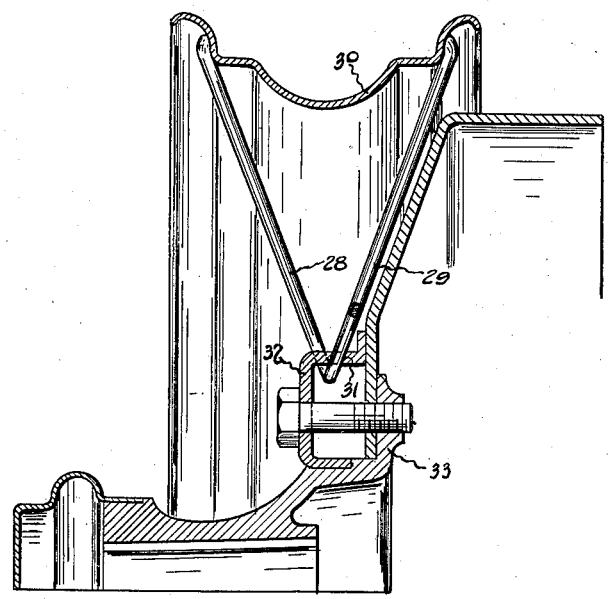
Figure 6 is a view similar to Figure 2, showing another embodiment of my invention.

As shown in Figures 1, 2 and 3, the wire spoked wheel has the hub member 1, the rim member 2 and the front and rear rows of spokes 3 and 3', respectively. The hub member has the barrel and rear flange portions 4 and 5, respectively, the latter of which is formed with the openings 6 for receiving the means, such as bolts and nuts, for securing the hub member and consequently the wheel upon the inner hub (not shown).

Both the front and rear row of spokes have the heads 7 at there outer ends for seating in the depressions 8 formed in the base of the rim member and affording a connection between the spokes of the rim member. The front row of spokes and also the rear row of spokes are arranged in sets and more particularly in pairs, comprising the spokes 9 and 10 for each pair of front spokes and the spokes 11 and 12 for each pair of rear spokes. The barrel portion 4 of the hub member 1 is formed with the angularly spaced longitudinally extending openings 13, each opening being of a size to receive the bent inner end portions 14 of the diverging spokes 9 and 10. These inner end portions extend inwardly beyond the barrel portion 4, as shown particularly in dotted lines in Figure 1, and are fixedly and rigidly secured to each other by welding and upsetting to form the single head 15, as shown in full lines in Figure 1, for the spokes of each pair. The rear flange portion 5 of the hub member 1 is formed with the angularly spaced peripherally extending openings 16, each of which is of a size to receive the bent inner end portions 17 of the diverging spokes 11 and 12. These end portions also extend inwardly beyond the flange portion and are fixedly and rigidly secured to each other by being welded and upset to form a single head 18 for each pair of rear spokes. The welding and upsetting is carried out in a manner to make the heads rectangular or, more particularly, diamond shaped in contour, as shown in Figure 3, with substantial portions of the heads at opposite sides of the openings in the hub member and on opposite sides of the longitudinal median lines through these openings.

In assembly, the hub and rim members 1 and 2 respectively are accurately positioned and held in concentric relation, at which time the rear spokes 3' are assembled therewith and the extensions at their inner ends are welded and upset by pressure, during which the heads 7 at the outer ends of these rear spokes are held firmly against the depressions 8. The hub and rim members are then relatively moved axially, as designated by the arrows in Figure 2, to place an over tension upon the rear spokes. The concentric relation of the hub and rim members is still maintained and after this relative movement the extensions at the inner ends of the front spokes are welded and upset by pressure, during which time the heads 7 at the outer ends of these front spokes are held against their respective depressions 8. The loose assembly of the front spokes with the hub and rim members may take place at the same time as the loose assembly of the rear spokes with the hub and rim members or the front spokes may be assembled, if desired, after the welding and upsetting operation upon the rear spokes. The wheel may then be removed from the fixture, at which time the over tension of the rear spokes will be distributed to the front spokes to place the same under tension.

In the embodiment illustrated in Figure 4, one of the rows of spokes of the wheel is so arranged that a spoke of each set or pair extends through a peripherally extending opening in the rim member and its extension is fixedly and rigidly secured to the extension of a spoke of another set or pair. More in detail, 19 and 20 are diverging spokes forming the sets or pairs, comprising the rear row of the spokes of the wheel. The inner ends of these spokes 19 and 20 are upset and headed in the same manner as illustrated in Figures 1, 2 and 3, with the exception that the heads 21 are elliptical shaped. The spoke 20 of one set or pair crosses the spoke 19 of the adjacent set or pair and extends at its outer end through the peripherally extending elongated opening 22 in the rim member with the spoke 19 of the next set or pair. The extensions of these two spokes are fixedly and rigidly secured to each other by being welded and upset to form the head 23 which is located in the depression 24 formed in the base of the rim member and has its outer face substantially flush with the remaining portion of the base of the rim member.

In the embodiment illustrated in Figure 5, the diverging spokes 25 and 26 of the set or pairs of front spokes are also arranged and connected to the rim member 27 in the same manner as the spokes 19 and 20 illustrated in Figure 4. It will be seen that in this embodiment all of the spokes are secured in place by having their end portions welded and upset.

Figure 7:
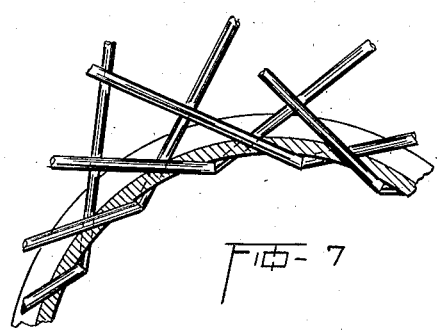
Figure 7 is a section through Figure 6.

In the embodiment illustrated in Figures 6 and 7, straight spokes are employed. These spokes are arranged in pairs comprising a front spoke 28 and a rear spoke 29, which are fixedly secured at their outer ends to the front and rear portions respectively of the rim member 30. The front and rear spokes of each pair diverge inwardly and extend through the openings 31 in the annular portion 32 of the hub or mounting member 33. Each spoke is inserted through a separate hole formed to permit the spoke to remain straight and to extend generally tangentially of the hub or mounting member. Furthermore, the arrangement provides for locating the inner end or the portion inside the hub or mounting member of each spoke 28 to abut the inner end or corresponding portion of the spoke 29. By applying movable electrodes to these inner ends or abutting portions they are butt-welded to each other and both the front and rear spokes are permanently attached to the hub or mounting member.

What I claim as my invention is:

1. The method of manufacturing a spoked vehicle wheel, which consists in locating and holding the hub and rim members of the wheel in a predetermined relation to each other, placing spokes in connection with the rim member at their outer ends, arranged these spokes in sets with the spokes of each set extending through the hub member at their inner ends and having their extensions inside the hub member adjacent to each other, and then welding these extensions together.

2. The method of manufacturing a spoked vehicle wheel, which consists in locating and holding the hub and rim members of the wheel in a predetermined relation to each other, placing spokes in connection with the rim member at their outer ends, and arranging the spokes in sets extending through the hub member at their inner ends and having their extensions inside the hub member in close proximity to each other and then welding and upsetting the extensions to form a single head at the inner ends of the spokes of each set.

3. The method of manufacturing a spoked vehicle wheel, which consists in locating and holding the hub and rim members of the wheel in a predetermined relation to each other, placing spokes in connection with the rim member at their outer ends, and arranged the spokes in pairs with the spokes of each pair extending through a single opening in the hub member and having adjacent extensions inside the hub member, and then welding the extensions of each pair of spokes together with pressure applied to the extensions to form a single head at the inner ends of each pair of spokes.

4. The method of manufacturing a spoked vehicle wheel, which consists in locating and holding the hub and rim members of the wheel in concentric relation, placing spokes in connection with one of the members at one of their ends, arranging the spokes in sets with the spokes of each set passing through a single opening in the other of the members and having adjacent extensions therebeyond, and welding and upsetting the extensions of each set to form a single head for each set.

5. A spoked vehicle wheel having a hub member, a rim member, and spokes connecting said hub and rim members, one of said members having spoke receiving openings and said spokes being arranged in sets with the spokes of each set extending through the same opening and having corresponding ends beyond the opening welded to each other.

6. A spoked vehicle wheel having a hub member, a rim member, and spokes connecting said hub and rim members, said hub and rim members having spoke receiving openings, and said spokes being arranged in pairs with the spokes of each pair having their inner ends extending through the openings in said hub member and rigidly connected to each other and with spokes of different pairs extending through the openings in said rim member and rigidly connected to each other.

7. A spoked vehicle wheel having a rim member and an inner member, and spokes connecting said rim and inner members one of said members having spoke receiving openings and said spokes being arranged in sets with the spokes of each set extending through the same opening and having corresponding ends beyond the opening welded to each other.

CHARLES S. ASH.